Patented Aug. 22, 1944

2,356,505

UNITED STATES PATENT OFFICE 2,356,505

PROCESS FOR STERILIZATION OF ORGANIC SUBSTANCES

Henry Marinus Christensen, Copenhagen, Denmark; vested in the Alien Property Custodian No Drawing. Application March 11, 1942, Serial No. 434,266. In Denmark May 20, 1941

5 Claims. (Cl. 21—2)

The present invention relates to a process for sterilization or disinfection of any organic substances, or substances with organic constituents containing microorganisms, bacteria, fungi or spores, which substances do not themselves offer suitable conditions for spore germination, such as intestines or catgut, hair or bristles for brushes, fibrous material of any kind and shape, articles of rubber and silk, suitable for use in surgery, any material which has to be preserved, such as hormones, vitamins and medicines, any material which has to be freed from germs before further manufacturing or use, such as drugs or tobacco leaves and other substances, wholly or partly of artificial, vegetable or animal origin, for instance products of animal organs, whether the substances be in solid or liquid or semiliquid state.

The processes commonly used heretofore for sterilization of material containing or contaminated with spores, for instance, intestines or catgut, suffer from the drawback that no complete sterilization can be attained with security, but only a certain disinfection, as the resistant microbic spores will not be killed, for instance, spores of the bacteria of anthrax, tetanus and gas-gangrene. Experience has thus shown that commercial catgut threads, disinfected by heating repeatedly, at various stages of the manufacture, to 120° or 150° C. in organic liquids and the like, or having been treated in some disinfecting liquid, for instance a solution of iodine, contain a multitude of resistant spore-producing bacteria which similarly will not be killed by any further disinfection performed by the surgeon, before use. Further, the quality of the organic substances will suffer greatly by the treatments, especially thermal treatments, to which they are exposed. Thus for instance the catgut acquires a relatively low tensile strength, for which reason it will burst easily during use. The said drawbacks are remedied by the present process.

According to this process, the organic material, for instance the raw gut material for the manufacture of a catgut, is treated in such a manner that any spores of the spore producing microbes may be able to germinate, and the cultivation is performed during such a short time that the spores will certainly germinate, but the microbes will not have time to form new resistant spores, after which the microbes are killed by the subsequent exposure of the material to a disinfecting or sterilizing process which owing to the state into which the microbes have now been brought does not have for its object to kill the resistant spores. As the question is merely to kill the vegetative microbe forms that have less resistance to sterilizing than the spore form, it will be easily feasible, by a suitable method, to make the sterilization complete, at the same time without affecting the material to any considerable extent.

It has previously been attempted to attain a more reliable catgut sterilization by first cultivating the gut material in a culture medium, according to the German Patents No. 600,512 and No. 642,968. But the cultivations concerned have been of long duration, at least 4 and 10 days, respectively, during which there are ample opportunities for a production of spores that will not be killed more easily by the disinfection following, for which reason the sterilization attained in this manner will hardly be more reliable than without the preliminary cultivation, and in any case no sufficiently effective sterilization will be attained. The material will further be weakened at the same time during the lengthy action of the culture medium and the microbes growing in the same and causing for instance the production of alkaline metabolic substances that the first mentioned patent has for its object to neutralize by the addition of a source of acid.

The important feature, according to this invention, is to select the conditions of cultivation in such a manner that all the spores of deleterious microbes present, aerobic as well as anaerobic ones, will germinate during the course of a relatively short time within which no new resistant forms of spores will be produced, and without the goods having been altered materially by the action of microbes. The maximum duration of the cultivation process will be about 72 hours or less, for example, 24 hours or less. In a preferred execution of the process only the duration of a few hours is used, for example, less than one to four or six hours, by use of liver broth or other media or substances which are able to accelerate spore germination.

The treatment may be performed, maybe after a requisite preliminary treatment of the material, by placing the same in a cultivating apparatus, at suitable and maybe varying temperatures, and with a suitable culture medium, or with several such, containing perhaps oxygen-binding agents. These agents may be organic or inorganic chemicals or organic matters such as pieces of tissues. The cultivation may be performed in varying atmospheres, under aerobic and anaerobic conditions—for instance under hydrogen, carbon dioxide, nitrogen, oxygen etc., or mixtures of such gases, or in vacuum. Then follows a treatment with microbicidal agents, for instance chemicals or ultra-violet rays, or special forms of heat-treatment, by which all of the microbes, including also the germinated spores, will be killed. This treatment may be performed after the material has been freed from the culture medium. A thermic treatment may for instance be performed on the quickly dried material. Owing to the quick drying, the spore-producing bacteria will produce no, or merely a few, weakened and only faintly heat-resistant spores which will be easily killed by the thermal treatment. It may often be advisable to alter the pH value during the cultivation.

In certain cases the material may be of such a nature that for cultivation, it cannot be placed, or does not have to be placed, in a special culture medium. By an addition of suitable substances, an alteration of the pH value, or some other treatment, the material itself may be caused to offer suitable conditions for spore-germination and act as if it was a culture medium itself.

In order to be able to work with the greatest possible certainty, it may be desirable in certain cases, that the material should be subjected two or more times to the treatment for spore-germination and a subsequent sterilizing process. If chemicals are used for the sterilization, the same must first be eliminated, for example, neutralized, annihilated or removed to such an extent that a repeated cultivation can take place. In the process of repeated cultivation and sterilization, the manner of treatment used may perhaps be modified, for instance by cultivating for longer periods, in other media and the like.

For sterilization of catgut, the process mentioned in the example with one single cultivation and subsequent sterilization has proved to result in the complete killing of all microbes occurring in the initial material, since extensive controlling cultivations in various especially favourable media under aerobic conditions, as well as under various anaerobic conditions, during periods of up to one month, have not shown the growth of microbes of any kind.

If the process is used at an early stage of the manufacture of the goods concerned—for instance in the example where catgut is concerned—the further treatment of the goods must be effected in a sterile, or mainly sterile manner, and in the last mentioned case it must be finished with a supplementary sterilization which nevertheless does not have to fill very rigid requirements, as it will be easy to make sure, that the material will merely be infected or contaminated with air bacteria and the like which produce no spores and are easy to kill.

Thus the catgut threads, sterilized according to the process and afterwards treated in a merely partially aseptic way, have been able to be sterilized at last in such an easy manner that the tensile strength of the finished goods will be from 50 to 100 percent higher than the tensile strength of the ordinary catgut threads. The process provides in this way, besides a securely sterile product, also the manufacture of a very strong catgut. Besides the now commonly used sheep and lamb guts, we may also use cheaper kinds of guts, for instance, swine guts which previously could not be used, because they would be weakened too much by the sterilization methods used heretofore, or guts may be used that heretofore would have been rejected on account of too high a content of bacteria.

The process may be used to advantage for sterilization, for instance, of bristles, hair and fibrous substances of any kind and shape in raw and finished state. In this connection it may be mentioned that it has been very difficult to sterilize effectively animal bristles and hair from animals suffering from anthrax. In several cases diseases and deaths have therefore occurred owing to the use of insufficiently disinfected bristles and hair, for instance shaving brushes. Among other uses of the process valuable in practice, I may also mention the sterilization of products obtained from animal organs or from vegetable source material, for instance, hormone preparations and canned food. The sterilization may preferably be effected in a manner that is harmless to the goods.

*Example*

Sheep guts are treated preliminarily by scraping according to known methods until they are freed from superfluous material, and they are cut into suitable lengths, to the ends of which the usual string straps are attached. Then they are placed into cultivation glasses with freshly boiled liver broth with pH of 7.6, in such a manner that the entire material is covered with the broth. Then the cultivation glass is placed in a Zeissler anaerobic jar which is pumped out to vacuum by means of an oil pump, and the glass is then placed in a thermostat at 37° C. for three hours. Then the cultivation glass is removed from the Zeissler jar, and is now left under aerobic conditions in a thermostat at 37° C. for one to two hours. Then the material is transferred to a sterile one percent solution of iodine in a potassium iodide solution, 3 in 200, poured into a sterile glass-bulb, in which it is treated for 24 to 48 hours. After this treatment, the material is transferred, in sterile manner, to a bulb with a sterile ten percent solution of sodium thiosulphate in sodium carbonate solution, 1 in 100, and is treated here for 24 hours, in such a manner that the main part of the iodine is removed from the material. The latter is then transferred to a vessel with sterile water for washing. The extent of the sterilization may be controlled by repeated cultivation, this time for longer periods.

Having thus described my invention, what I claim is:

1. A process for the sterilization of materials containing bacteria at least in part in form of resistant spores, which comprises subjecting the material to conditions favorable to the growth of said bacteria and the germination of said spore for a time sufficient to germinate substantially all the spores of said bacteria with the substantial disappearance of the spore form, said time being limited so that substantially no additional resistant spores are formed and then sterilizing the material.

2. A process for the sterilization of materials not normally conducive to spore germination, said material containing bacteria at least in part in form of resistant spores, which comprises adding a culture medium to said material, maintaining said material and culture medium under conditions favorable to spore germination for a time sufficient to cause substantially all the spores to germinate, said time being sufficiently limited to prevent formation of new resistant spores, and then sterilizing said material.

3. A process for the sterilization of cat gut or the like material not normally conducive to spore germination and containing bacteria at least in part in the form of resistant spores, which comprises adding a culture medium to said material, maintaining said material and culture medium under conditions favorable to spore germination for a time sufficient to cause a substantial proportion of the spores to germinate, said time being sufficiently limited to prevent formation of new resistant spores, then sterilizing said material, again adding a culture medium to said material, maintaining said material and culture medium under conditions favorable to spore germination for a time sufficient to cause a substantial proportion of the residual spores to germinate, said time being sufficiently limited to prevent formation of new resistant spores, and then sterilizing said material.

4. A process for the sterilization of materials such as cat gut or the like not normally conducive to spore germination and containing bacteria at least in part in the form of resistant spores which comprises adding a culture medium to said material, maintaining said culture medium and material under conditions favorable to spore germination for a period of approximately 1 to 6 hours to cause substantially all the spores to germinate without the formation of new resistant spores, and then sterilizing said material.

5. A process for the sterilization of sheep gut comprising adding liver broth having a pH of approximately 7.6 to said sheep gut, maintaining said mixture of liver broth and gut under a vacuum at approximately 37° C. for a period of approximately 3 hours, releasing the vacuum and maintaining said mixture under aerobic conditions for a further period of 1 to 2 hours at approximately 37° C. and then sterilizing said gut.

HENRY MARINUS CHRISTENSEN.